(12) United States Patent
Yamaguchi et al.

(10) Patent No.: US 11,555,776 B2
(45) Date of Patent: Jan. 17, 2023

(54) LIGHT SCATTERING DETECTION APPARATUS

(71) Applicant: Shimadzu Corporation, Kyoto (JP)

(72) Inventors: Toru Yamaguchi, Kyoto (JP); Atsushi Kasatani, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/166,758

(22) Filed: Feb. 3, 2021

(65) Prior Publication Data

US 2022/0244163 A1   Aug. 4, 2022

(51) Int. Cl.
*G01N 15/14*   (2006.01)

(52) U.S. Cl.
CPC .................. *G01N 15/1434* (2013.01)

(58) Field of Classification Search
None
See application file for complete search history.

(56) References Cited

U.S. PATENT DOCUMENTS 4,616,927 A    10/1986  Phillips et al.

2003/0090666 A1*  5/2003  Kaufmann ......... G01N 21/3504
                                                356/438
2010/0315637 A1   12/2010  Trainoff
2016/0216213 A1*  7/2016  O'Brien ................. G01N 21/05

FOREIGN PATENT DOCUMENTS

JP    1995072068       3/1995
JP    2015111163 A     6/2015

OTHER PUBLICATIONS

Odaka et al., "Analysis of absolute molecular weight and complex formation of proteins by light scattering method," Biotechnology vol. 89, pp. 398-400, 2011. This document referenced in present application at paragraph [0007].

* cited by examiner

*Primary Examiner* — Rufus L Phillips
(74) *Attorney, Agent, or Firm* — Muir Patent Law, PLLC

(57) ABSTRACT

Disclosed in a light scattering detection apparatus, including a sample cell for holding a liquid sample therein, a light source for irradiating the sample cell with coherent light, a detector for detecting light that coming from the sample cell, and a pair of holders for holding ends of the sample cell. Either or both of the holders has a double flange structure. The double flange structure includes a first flange configured to receiving the sample cell and a second flange configured to hold a tube connected to the sample cell. The second flange is detachably attached to the first flange.

3 Claims, 8 Drawing Sheets

LIGHT SCATTERING DETECTION APPARATUS

BACKGROUND OF THE INVENTION

1. Technical Field

The present invention relates to a cell holder for holding a sample cell through which a liquid sample is passed, and a light scattering detector used for a fine particle detector for measuring a molecular weight, a radius of gyration (size), or the like of fine particles dispersed in the liquid sample.

2. Background Art

Size exclusion chromatography (SEC) and gel permeation chromatography (GPC) are known as methods for separating fine particles such as proteins dispersed in the liquid sample. In recent years, as a chromatography detector, a multi-angle light scattering (MALS) detector has been used in addition to an ultraviolet (UV) absorbance detector and a differential refractive index detector. The MALS detector has a feature that the molecular weight and a particle size of a measurement sample can be calculated (see PATENT LITERATURES 1 and 2).

FIG. 5 illustrates a coordinate system in a scattered light emission direction when a scattered light generating light source is disposed at the origin. As illustrated in FIG. 5, light is incident in a positive direction of the X direction on the XY plane, and a scattering angle of the light from a traveling direction on the XY plane is defined as θ, and an angle from the XY plane is defined as φ.

Next, FIG. 6 illustrates a plan view of a basic configuration example of the MALS detector, and FIG. 7 illustrates a side view thereof. In FIGS. 6 and 7, 310 is the sample cell, 311 is the liquid sample, 320 is the light source, 321 is a condenser lens, 340 is a slit plate, 350 is an imaging lens, 360 is an aperture plate, and 370 is a detector.

As illustrated in FIGS. 6 and 7, a liquid sample 311 is passed through a cylindrical sample cell 310, and light is emitted from a light source 320 so as to pass through the sample cell 310 and a center of a flow path. As the light source, visible laser beam is usually used. The angle θ from the traveling direction of the light is defined as the scattering angle on the horizontal plane (on the XY plane), and a plurality of detectors 370 is arranged on the horizontal plane (on the XY plane) passing through the sample cell 310 and the center of the flow path so as to detect different scattering angles. FIG. 6 illustrates an example in which two detectors 370 are arranged at arrangement angles of θ1 and θ2.

FIG. 8 is a schematic view of a cell holder having a conventional structure. As illustrated in FIG. 8, the sample cell 310 is fixed by a lower holder 420 and an upper holder 430. Flow paths 470 are respectively formed inside the lower holder 420 and the upper holder 430, and connect tubes 440 and a flow path 312 of the sample cell 310. The tubes 440 are respectively fixed to the lower holder 420 and the upper holder 430 by fittings 450. An O-ring 460 is attached to each holding portion of the lower holder 420 and the upper holder 430 in order to align a central axis of the flow path 312 of the sample cell 310 on the XY plane with a center of an optical axis of an incident light, and to align a central axis of the tube 440 and the central axis of the flow path 312.

CITATION LIST

Patent Literature

PATENT LITERATURE 1: JP-A-07-072068
PATENT LITERATURE 2: JP-A-2015-111163
NON-PATENT LITERATURE 1: "Analysis of Absolute Molecular Weight and Complex Formation of Proteins by Light Scattering Method", Masafumi Odaka, Biotechnology Vol. 89

SUMMARY OF THE INVENTION

In the MALS detector, the sample adheres to an inner surface of the flow path of the sample cell every time measurement is repeated, and background signal increases. An amount of increase in the background signal varies depending on a detector arrangement angle, and is more remarkable when the detector is arranged at a lower scattering angle. Increase in the background signal reduces measurement accuracy. To remove the sample adhering to the inner surface of the flow path, brushing and cleaning is effective. Since an inner diameter of the flow path in the cell holder is as small as 0.0 mm to 0.5 mm, it is not possible to brush a cell flow path having an inner diameter of 0.5 mm to 0.0 mm through the cell holder. Therefore, when brushing and cleaning the cell flow path, it is necessary to remove the sample cell from the cell holder. However, once the sample cell is removed, it is necessary to readjust an optics, and there has been a problem that it takes a lot of time and effort to readjust the optics.

Therefore, an object of the present invention is to provide a cell holder capable of cleaning the inner surface of the flow path of the sample cell well and efficiently without removing the sample cell, and a light scattering detector including the cell holder.

A cell holder of a light scattering detector according to one aspect of the present invention is a cell holder for holding a sample cell of the light scattering detector, in which at least one of a pair of holders for holding both ends of the sample cell is formed in a double flange structure including: a first flange that holds the sample cell; and a second flange that holds a tube connected to the sample cell.

In the above configuration of the cell holder of the light scattering detector, it is preferred that the sample cell is disposed in a vertical direction, and an upper holder of the pair of holders is formed in the double flange structure.

It is preferred that the first flange has a boss for holding the sample cell via a packing at a lower portion thereof, and has a tube housing recess for housing the tube held by the second flange at an upper portion thereof, and the second flange is detachably connected on the first flange.

Further, it is preferred that the second flange has a tube housing recess for housing a probe of the tube.

A light scattering detector according to one aspect of the present invention is a light scattering detector for detecting fine particles in a liquid sample, including at least: a transparent sample cell that holds a liquid sample; a light source that irradiates the sample cell with coherent light; an imaging optics that collects light scattered from the sample cell to the surroundings with different scattering angles; and a detector that receives collected light from the imaging optics, in which the sample cell is held in any one of the cell holders described above.

According to the present invention, it is possible to provide a cell holder capable of cleaning the inner surface of the flow path of the sample cell well and efficiently without removing the sample cell, and a light scattering detector including the cell holder.

DETAILED DESCRIPTION OF THE EXEMPLARY EMBODIMENTS

Figure 1:
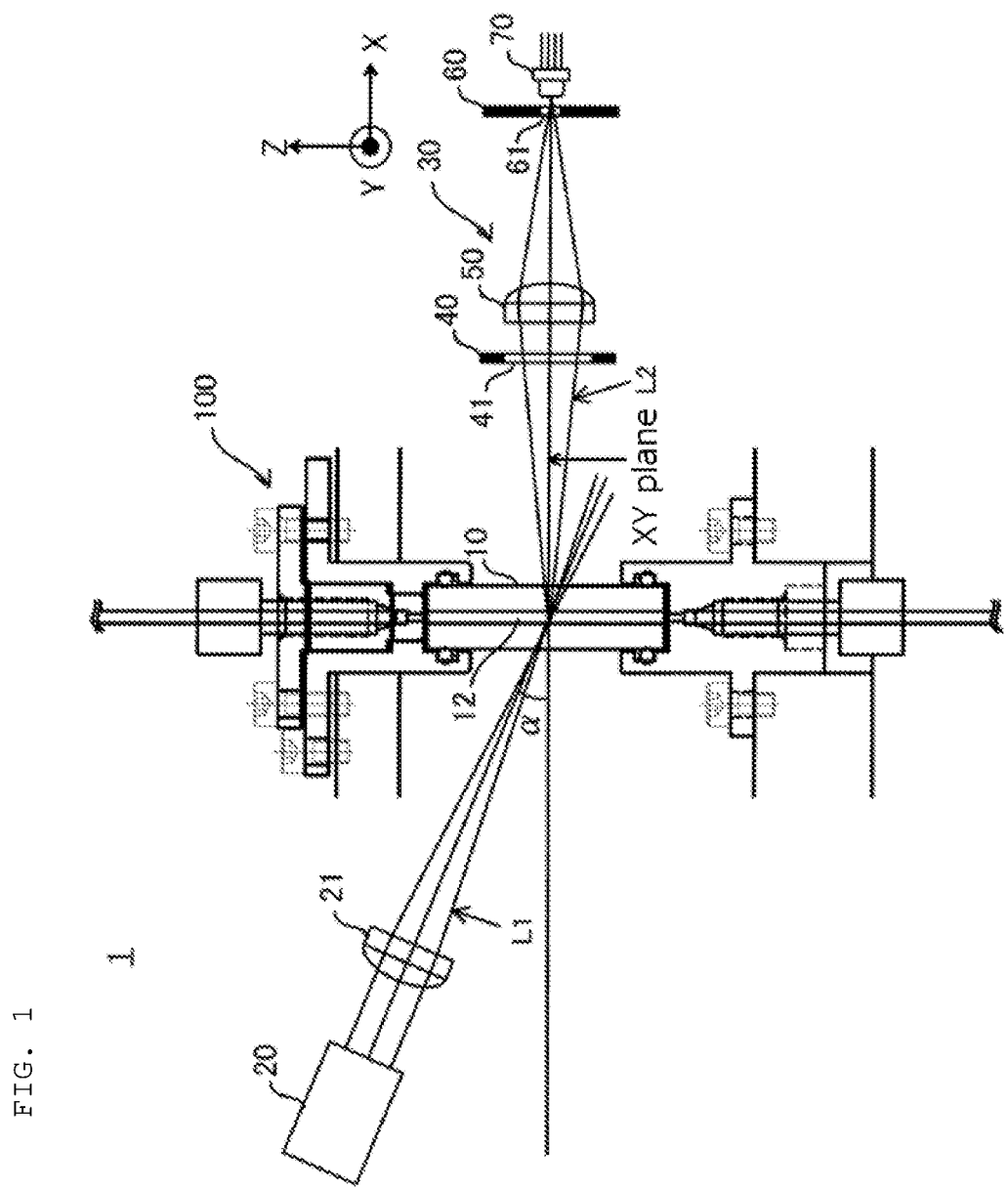
FIG. 1 is a side view of a light scattering detector according to the present embodiment.

Hereinafter, an embodiment of a cell holder and a light scattering detector according to the present invention will be described with reference to the drawings. In the drawings, those having the same reference numerals have the same or similar configurations.

Configuration of Light Scattering Detector

First, the light scattering detector incorporating the cell holder according to the present embodiment will be described with reference to FIG. 1. FIG. 1 is a side view of the light scattering detector according to the present embodiment. As illustrated in FIG. 1, a light scattering detector 1 according to the present embodiment is a device that detects a molecular weight and a radius of gyration (size) of fine particles such as proteins dispersed in a liquid sample. The light scattering detector 1 includes a sample cell 10, a light source 20, a slit plate 40, an imaging optics 50, an aperture plate 60, and a detector 70. Hereinafter, each component will be described.

The sample cell 10 is a transparent cylindrical cell that holds the liquid sample in a flow path inside the sample cell 10. The sample cell 10 is formed of, for example, colorless and transparent quartz glass. The sample cell 10 is held in a cell holder 100 of the present embodiment described below.

The light source 20 irradiates the sample cell 10 with coherent light. The "coherent light" means light in which a phase relationship of a light wave at any two points in a luminous flux is time-invariant and kept constant, and even if the luminous flux is divided by an arbitrary method and then superposed again with a large optical path difference, it shows perfect coherence. As the light source 20, for example, a laser beam source for irradiating a visible light laser is employed. There is no perfect coherent light in nature, and laser beam that oscillates in single mode is close to a coherent state.

A condensing optics 21 is disposed in an optical path L1 of an incident light from the light source 20 to the sample cell 10. As the condensing optics 21, for example, a single condenser lens is employed. The condenser lens is a plano-convex lens, and an incident side of the light from the light source 20 is formed in a convex surface and an exit side thereof is formed in a flat surface. In the present embodiment, the single condenser lens is employed as the condensing optics 21, but the condensing optics 21 may be configured by combining a plurality of compound lenses and condensing mirrors.

The light source 20 and the condensing optics 21 are arranged so that an optical axis of the coherent light incident on the sample cell 10 from the light source 20 is inclined at a predetermined angle (tilt angle $\alpha$) from a plane (the XY plane) including the sample cell 10 and the detector 70. Specifically, the light source 20 and the condensing optics 21 are arranged so that the incident light is incident on the sample cell 10 from obliquely above. By tilting (angle $\alpha$) the incident light with respect to the sample cell 10, it is possible to reduce stray light due to reflected light at an interface between the glass of the sample cell 10 and air and an interface between the glass and the flow path (hereinafter, collectively referred to as a "cell interface"). The laser beam emitted from the light source 20 passes through the condensing optics 21 and is then collected in the vicinity of a central axis of the sample cell 10.

A detection optics 30 is disposed on an optical path L2 of the light emitted from the sample cell 10. The detection optics 30 of the present embodiment includes the slit plate 40, the imaging optics 50, the aperture plate 60, and the detector 70.

The imaging optics 50 collects light scattered with different scattering angles from the sample cell 10 to the surroundings. As the imaging optics 50, for example, a single imaging lens is employed. The imaging lens is a plano-convex lens, and an incident side of the scattered light from the sample cell 10 is formed in a flat surface and an exit side thereof is formed in a convex surface. In the present embodiment, the single imaging lens is employed as the imaging optics 50, but the imaging optics 50 may be configured by combining a plurality of compound lenses and imaging mirrors.

The slit plate 40 is disposed between the sample cell 10 and the imaging optics 50 on the optical path L2 of the light emitted from the sample cell 10. The slit plate 40 limits a scattering angle range incident on the imaging optics 50. That is, a slit 41 opened in the slit plate 40 is long in a vertical direction and has at least a straight side in the vertical direction in order to limit the scattering angle in a horizontal direction and take in a large amount of luminous flux in the vertical direction. Specifically, the slit 41 has a vertically long rectangular shape or a vertically elongated hole shape.

The aperture plate 60 is disposed on the imaging optics side of the detector 70 on the optical path L2 of the light emitted from the sample cell 10. The aperture plate 60 has a function of limiting the stray light by an opening width of an opening 61 thereof. The opening 61 of the aperture plate 60 is opened in front of a light receiving surface of the detector 70.

The detector 70 receives collected light from the imaging optics 50. That is, the light receiving surface of the detector 70 is located at a focal point of the imaging optics 50. As the detector 70 of the present embodiment, for example, a photodiode (PD) is employed, but an array detector such as a two-dimensional CMOS may be employed.

Configuration of Cell Holder

Figure 2:
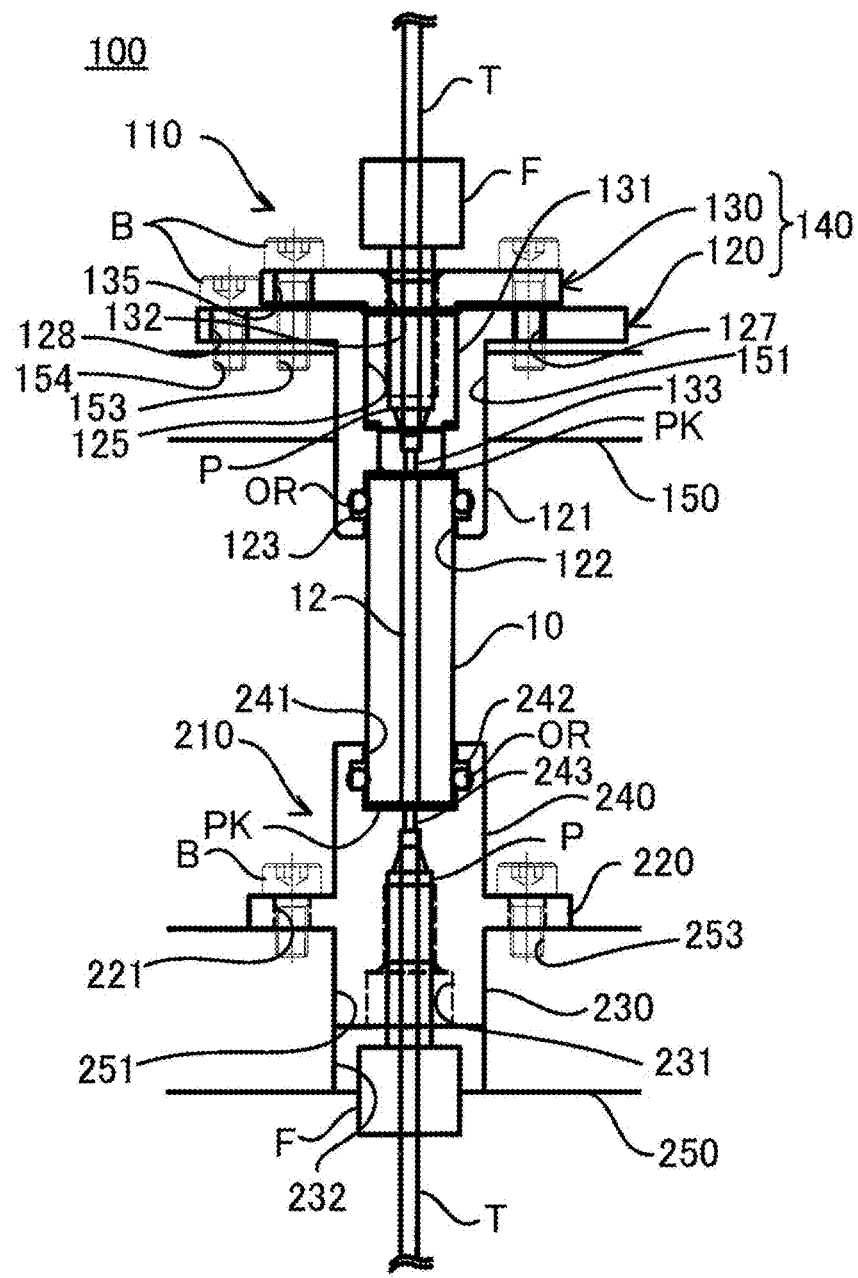
FIG. 2 is a schematic view of an assembled state of a cell holder according to the present embodiment.

Next, a configuration of the cell holder 100 according to the present embodiment will be described with reference to FIG. 2. FIG. 2 is a schematic view of an assembled state of the cell holder according to the present embodiment.

As illustrated in FIG. 1, the cell holder 100 according to the present embodiment is a device for holding the sample cell 10 of the light scattering detector 1. The cell holder 100 according to the present embodiment includes a pair of holders 110 and 210, a first flange 120, a second flange 130, and a third flange 220. Hereinafter, each component will be described.

The pair of holders 110 and 210 hold both ends of the sample cell 10. The sample cell 10 of the present embodiment is the transparent cylindrical cell that holds the liquid sample in a flow path 12 inside the sample cell 10. The sample cell 10 is disposed in the vertical direction. Therefore, the cell holder 1 according to the present embodiment includes a pair of a lower holder 210 that holds a lower end of the sample cell 10 and an upper holder 110 that holds an upper end of the sample cell 10.

The lower holder 210 is formed of, for example, a metal such as stainless steel. The third flange 220 is a ring-shaped projecting portion that projects radially outwardly, and is integrally formed with a lower boss 230 and an upper boss 240. A plurality of bolt insertion holes 221 is drilled at equal intervals in a circumferential direction of the third flange 220.

In the lower boss 230, a tube housing recess 231 and a fitting mounting recess 232 are formed up and down. The fitting mounting recess 232 is formed to have an inner diameter larger than that of the tube housing recess 231. The tube housing recess 231 and the fitting mounting recess 232 have their respective vertical central axes aligned and communicate with each other. A probe P of a tube T is mounted in the tube housing recess 231 via a fitting F. The fitting F is mounted in the fitting mounting recess 232 in a state where the probe P of the tube T is mounted in the tube housing recess 231.

The upper boss 240 is formed with a cell holding portion 241 for housing the lower end of the sample cell 10. The cell holding portion 241 is formed as a cylindrical recess. An inner diameter of the cell holding portion 241 is formed to be slightly larger than an outer diameter of the sample cell 10. A ring groove 242 for mounting an O-ring OR is formed in an inner peripheral wall of the cell holding portion 241. The O-ring OR urges the sample cell 10 from the surroundings in order to align a central axis of the flow path 12 of the sample cell 10 with a center of the optical axis of the incident light and to align a central axis of the tube T with the central axis of the flow path 12. A flow path 243 communicating with the tube housing recess 231 is formed on a cell contact surface of the cell holding portion 241. A packing PK is mounted between the cell contact surface of the cell holding portion 241 and a lower end surface of the sample cell 10.

The third flange 220 is detachably fixed to a lower pedestal 250. A cylindrical through-hole 251 is opened in the lower pedestal 250. Female threaded portions 253 are formed at portions corresponding to the bolt insertion holes 221 of the third flange 220 around the through-hole 251. The lower boss 230 is dropped into the through-hole 251 and the third flange 220 is disposed on the lower pedestal 250. The third flange 220 is fixed on the lower pedestal 250 by aligning the bolt insertion holes 221 of the third flange 220 with the female threaded portions 253 of the lower pedestal 250 and by fastening bolts B.

On the other hand, the upper holder 110 is formed in a double flange structure 140 of the first flange 120 for holding the sample cell 10 and the second flange 130 for holding the tube T connected to the sample cell 10. Like the lower holder 210, the upper holder 110 is formed of, for example, a metal such as stainless steel.

The first flange 120 has a first boss 121 that protrudes from a lower center thereof and holds the sample cell 10. A cell holding portion 122 for holding the upper end of the sample cell 10 is formed in a lower portion of the first boss 121. The cell holding portion 122 is a cylindrical recess and is formed to have an inner diameter slightly larger than the outer diameter of the sample cell 10. The O-ring OR urges the sample cell 10 from the surroundings in order to align the central axis of the flow path 12 of the sample cell 10 with the center of the optical axis of the incident light and to align the central axis of the tube T with the central axis of the flow path 12. A through-hole (not shown) is formed on a cell contact surface of the cell holding portion 122. The packing PK is mounted between the cell contact surface of the cell holding portion 122 and an upper end surface of the sample cell 10.

A recess 125 for housing a second boss 131 protruding from a lower portion of the second flange 130 is formed in an upper portion of the first boss 121. A lower portion of the recess 125 is reduced in diameter, and the recess 125 and the cell holding portion 122 communicate with each other.

As described above, the second boss 131 is formed to protrude from a lower center of the second flange 130. A tube housing recess 132 for housing the probe P of the tube T is formed in the second boss 131. A flow path 133 through which the tube T is inserted is opened on a bottom surface of the tube housing recess 132. The fitting F is disposed on the probe P of the tube T.

An outer diameter of the first flange 120 is set to be larger than that of the second flange 130. A plurality of two rows of bolt insertion holes 127 and 128 is drilled at equal intervals in the circumferential direction of the first flange 120. Outer bolt insertion holes 128 are holes for detachably fixing the first flange 120 to an upper pedestal 150. Inner bolt insertion holes 127 are holes for detachably connecting the second flange 130 to the first flange 120.

The first flange 120 is detachably fixed to the upper pedestal 150. A cylindrical through-hole 151 is opened in the upper pedestal 150. Female threaded portions 153 and 154 are formed at portions corresponding to the bolt insertion holes 127 and 128 of the first flange 120 around the through hole 151. The first boss 121 of the first flange 120 is dropped into the through-hole 151, and the first flange 120 is disposed on the upper pedestal 150. The first flange 120 is fixed on the upper pedestal 150 by aligning the bolt insertion holes 128 of the first flange 120 with the female threaded portions 154 of the upper pedestal 150 and by fastening the bolts B.

On the other hand, a plurality of bolt insertion holes 135 is formed at equal intervals in the circumferential direction of the second flange 130. The bolt insertion holes 135 of the second flange 130 are drilled in portions corresponding to the inner bolt insertion holes 127 of the first flange 120. The second flange 130 is fixed on the first flange 120 and the upper pedestal 150 by aligning the inner bolt insertion holes 135 of the second flange 130 with the inner bolt insertion holes 127 of the first flange 120 and the female threaded portions 153 of the upper pedestal 150, and by fastening the bolts B.

When assembling the lower holder 210, the sample cell 10, the upper holder 110, the tube T, and the fitting F, the sample cell 10 and the optics are adjusted to be centered so that the central axis of the flow path 12 of the sample cell 10 is aligned with the center of the optical axis of the incident light, and the central axis of the tube T is aligned with the central axis of the flow path 12.

Operations of Light Scattering Detector and Cell Holder

Next, operations of the light scattering detector 1 and the cell holder 100 according to the present embodiment will be described with reference to FIGS. 1 to 3. As illustrated in FIG. 1, the liquid sample is passed through the flow path 12 of a cylindrical sample cell 10. When passage of the liquid sample is completed, visible laser beam which is coherent light is emitted from the light source 20 through the condensing optics 21. As the visible laser beam travels along the optical path L1, the laser beam is incident on the liquid sample in the flow path of the sample cell 10. When the laser beam is incident on the liquid sample, the beam hits the fine particles contained in the liquid sample and is scattered with a predetermined scattering angle. Then, the scattered light emitted from the sample cell 10 passes through the slit 41 of the slit plate 40, and then passes through the imaging optics 50 and the aperture plate 60, to be received on the light receiving surface of the detector 70.

When the scattered light is emitted from the sample cell 10, the reflected light is generated as the stray light at the cell interface of the sample cell 10. Since the slit plate 40 is provided on the incident side of the imaging optics 50, the reflected light (stray light) can be limited by a plate portion of the slit plate 40. Further, since the aperture plate 60 further limits the stray light, the scattered light required for analysis is received by the light receiving surface of the detector 70.

In the light scattering detector 1, the sample adheres to an inner surface of the flow path 12 of the sample cell 10 every time measurement is repeated, and background signal increases. As described above, brushing and cleaning is effective for removing the sample adhering to the inner surface of the flow path 12. Since an inner diameter of the flow path 133 in the cell holder 100 is as small as φ1.0 mm to φ0.5 mm, it is not possible to brush the flow path 12 having an inner diameter of φ0.5 mm to φ2.0 mm through the cell holder 100.

As illustrated in FIG. 2, the cell holder 100 according to the present embodiment is formed in the double flange structure 140 of the first flange 120 for holding the sample cell 10 and the second flange 130 for holding the tube T connected to the sample cell 10. Therefore, when brushing and cleaning the inner surface of the flow path 12 of the sample cell 10, the bolt B fastened to the second flange 130 is removed to separate the second flange 130 from the first flange 120. The recess 125 of the first flange 120 houses the second boss 131 of the second flange 130. The tube housing recess 132 is formed in the second boss 131 of the second flange 130, and the probe P of the tube T is housed in the tube housing recess 132.

Figure 3:
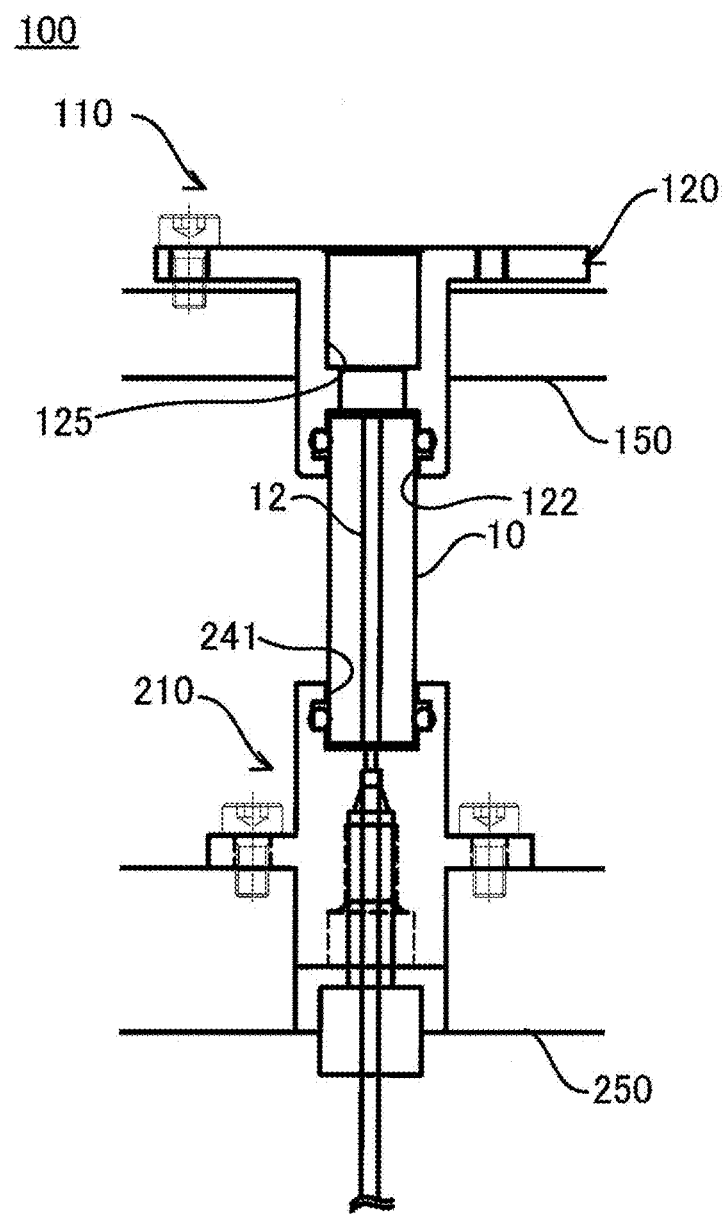
FIG. 3 is a schematic view of a disassembled state of the cell holder according to the present embodiment.

Therefore, as illustrated in FIGS. 2 and 3, when the second flange 130 is removed from the first flange 120, the probe P of the tube T and the fitting F can be removed together with the second flange 130.

FIG. 3 is a schematic view of a disassembled state of the cell holder according to the present embodiment. As illustrated in FIG. 3, the sample cell 10 is held between the cell holding portion 241 of the lower holder 210 and the cell holding portion 122 of the first flange 120 in the upper holder 110. As described above, the inner diameter of the flow path 133 formed in the second boss 131 of the second flange 130 is φ1.0 mm to φ1.5 mm, but the second boss 131 is not present in the disassembled state of FIG. 3 (see FIG. 2) because it is formed integrally with the second flange 130.

Therefore, the inner surface of the flow path 12 of the sample cell 10 can be brushed and cleaned through the recess 125 of the first flange 120. Since the inner surface of the flow path 12 can be brushed and cleaned without removing the sample cell 10 from the cell holder 100, it is not necessary to readjust the optics.

Cleaning Experiment

Figure 4:
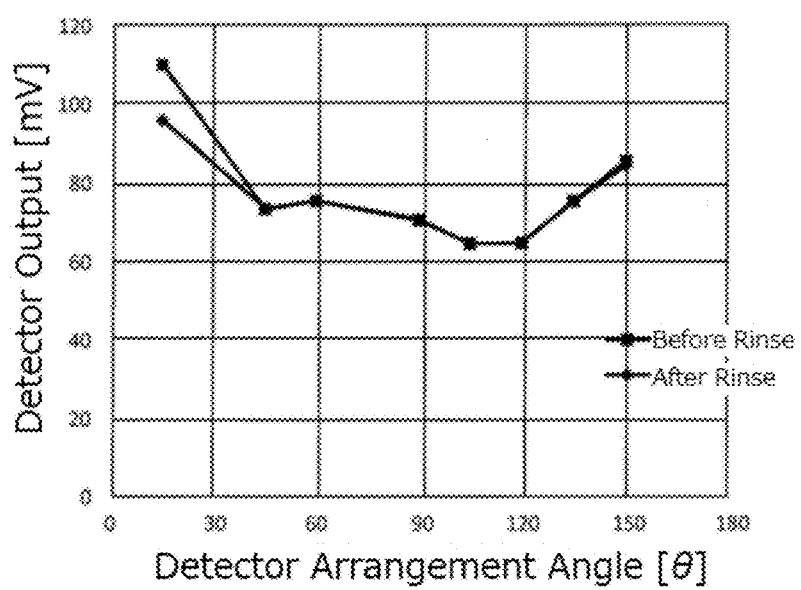
FIG. 4 is an explanatory diagram of a state before and after cleaning an inner surface of a flow path of a sample cell in the present embodiment.
Figure 5:
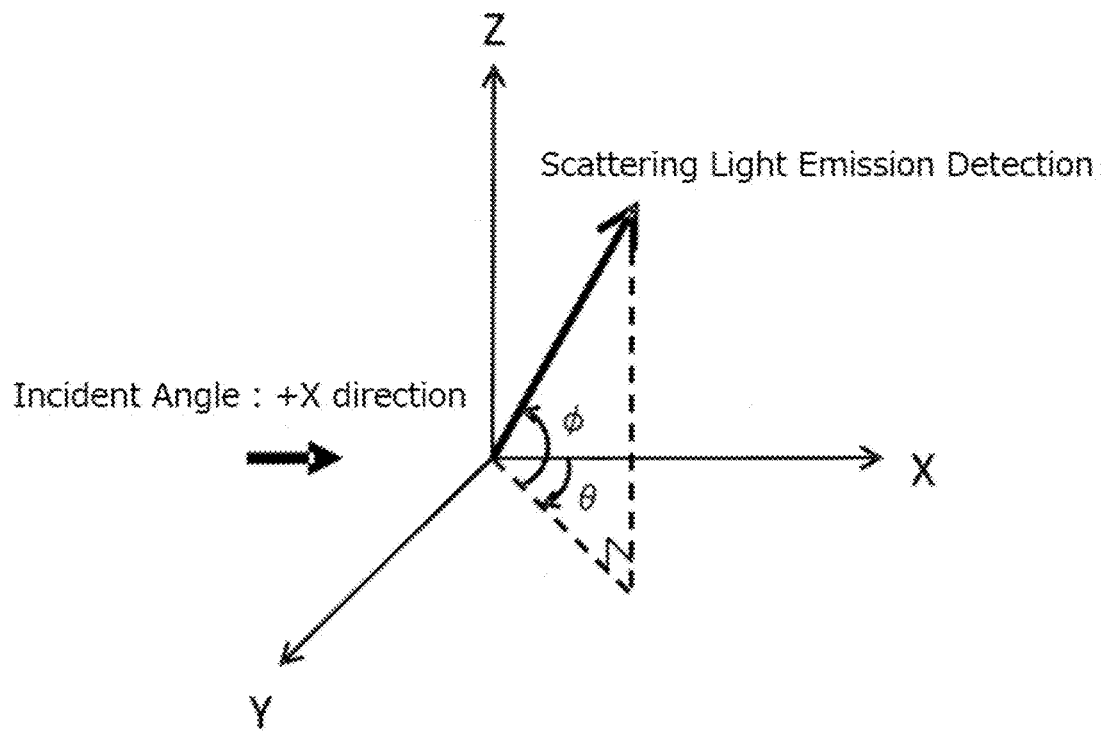
FIG. 5 is a coordinate system in a scattered light emission direction when a scattered light generating light source is disposed at the origin.
Figure 6:
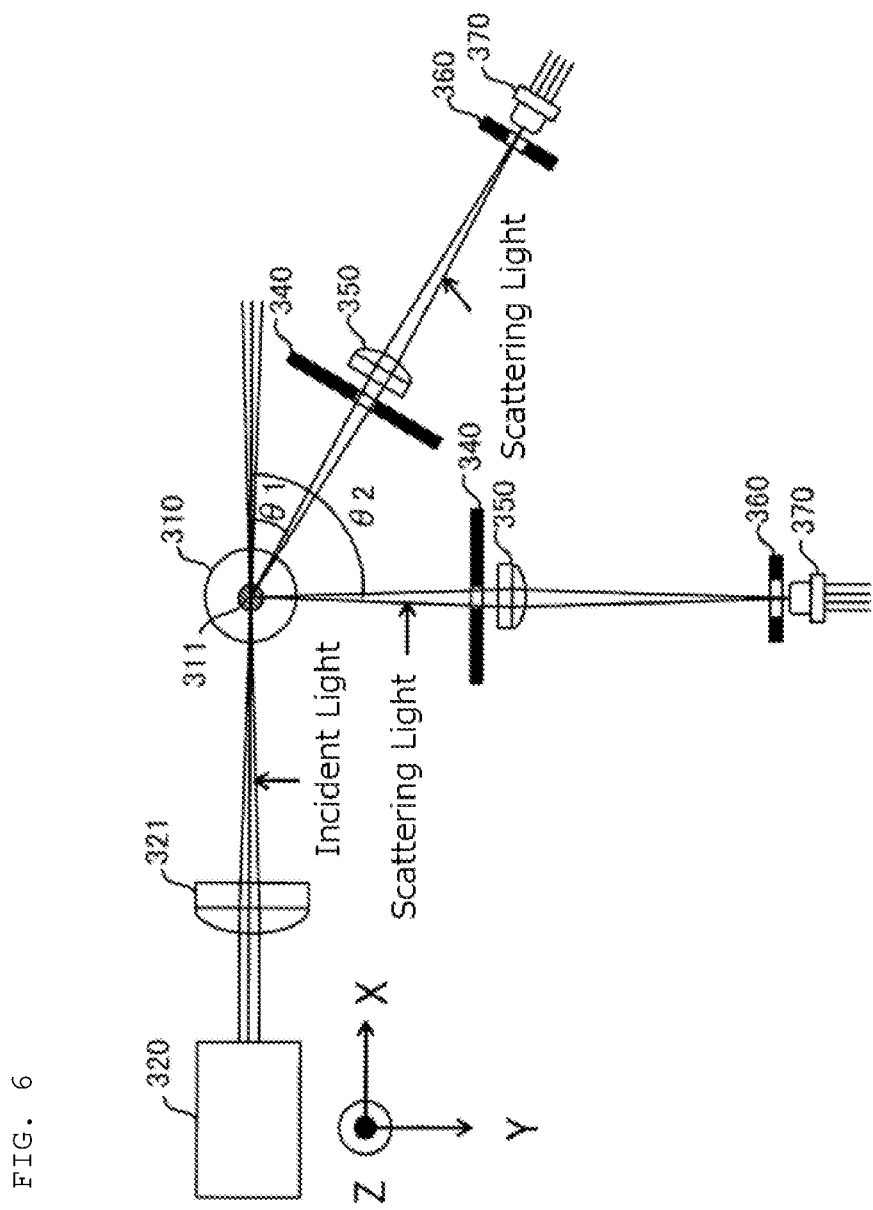
FIG. 6 is a plan view of a basic configuration example of a MALS detector.
Figure 7:
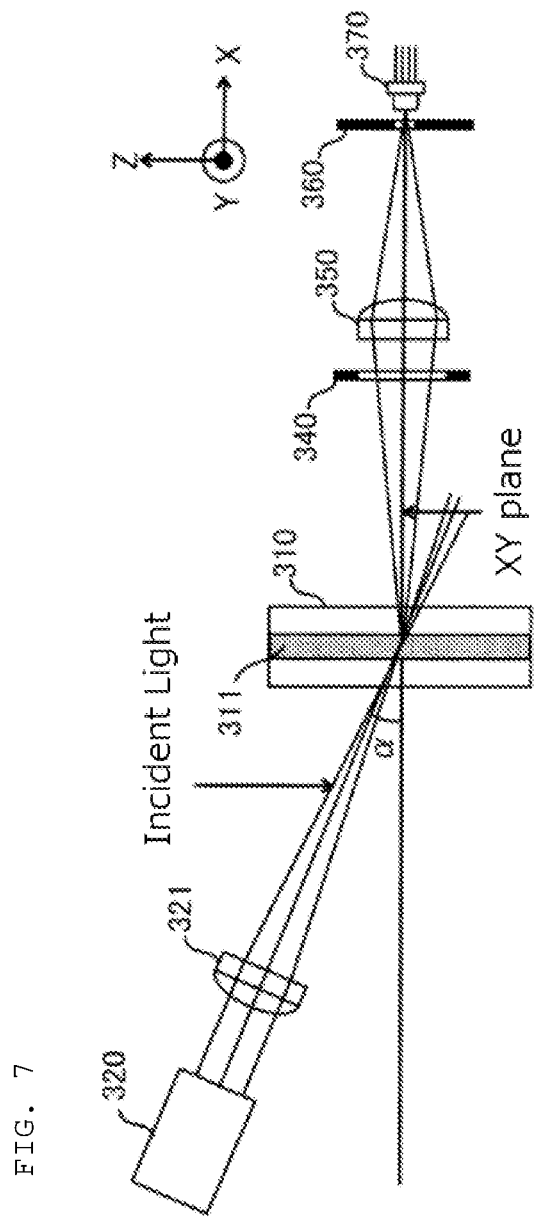
FIG. 7 is a side view of the basic configuration example of the MALS detector.
Figure 8:
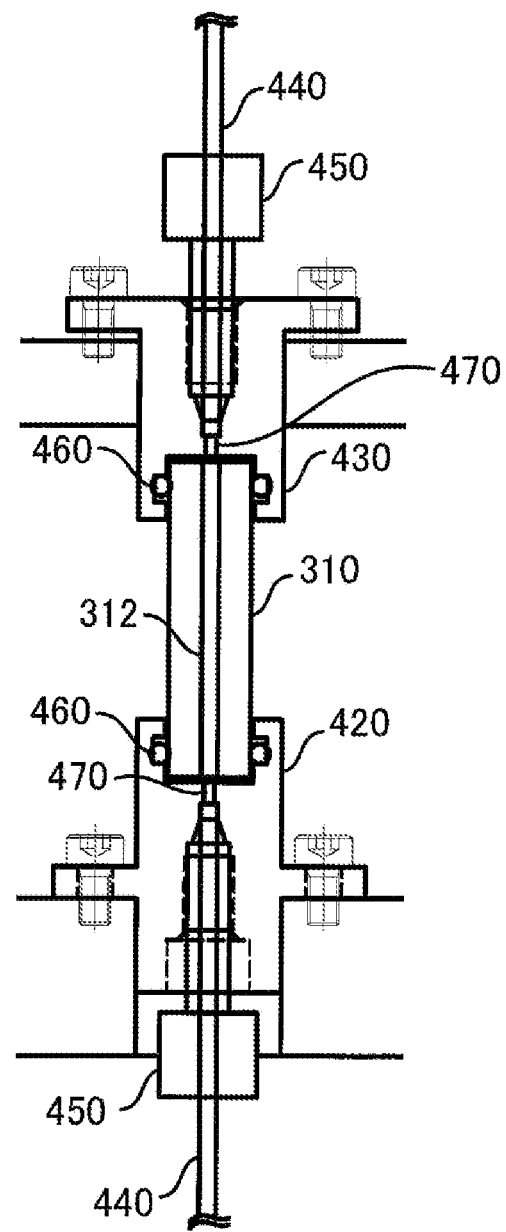
FIG. 8 is a schematic view of a cell holder having a conventional structure.

A cleaning experiment was performed to confirm operation and effect of the present embodiment. FIG. 4 is an explanatory diagram of a state before and after cleaning the inner surface of the flow path of the sample cell in the present embodiment. As illustrated in FIG. 4, detector output (mV) before and after cleaning was measured for each detector arrangement angle (θ) in the state of FIG. 3 while holding the sample cell in the cell holder according to the present embodiment. A slight decrease in the detector output was observed at a low arrangement angle of less than 30 degrees, but when the arrangement angle exceeded 30 degrees, the detector output was the same before and after cleaning, and a high cleaning effect could be confirmed. In this way, a cleaning state confirmation experiment can be performed while the sample cell is held in the cell holder.

As described above, according to the cell holder 100 according to the present embodiment, it is possible to clean the inner surface of the flow path of the sample cell well and efficiently without removing the sample cell.

According to the light scattering detector 1 provided with the cell holder 100, when deposits are generated in the flow path 12 of the sample cell 10 and the background signal increases, the inner surface of the flow path 12 can be brushed and cleaned simply by removing the second flange 130 that holds the tube T in the holder 110. The inside of the sample cell 10 is guaranteed to be airtight. Therefore, it is possible to perform brushing and cleaning with solvent sealed, thereby removing the deposits and reducing the background signal.

Since the cell holder 100 holding the sample cell 10 is fixed to the pedestals 150 and 250 during cleaning, a position of the sample cell 10 does not change, and it is not necessary to readjust the optics. Further, since adjustment of the optics is not required, the cleaning effect can be confirmed by checking background light. Furthermore, at the time of cleaning, a solution of a surfactant or the like that improves the cleaning effect is sealed in the flow path 12 of the sample cell 10, so that the cleaning can be performed efficiently.

The above embodiments are for facilitating understanding of the present invention, and are not for limiting interpretation of the present invention. Each component included in the embodiments and its arrangement, material, condition, shape, size, and the like are not limited to those exemplified, and can be changed as appropriate. Further, the components shown in different embodiments can be partially replaced or combined.

What is claimed is:

1. A light scattering detection apparatus, comprising:
   a sample cell for holding a liquid sample therein;
   a light source for irradiating the sample cell with coherent light;
   a detector for detecting light coming from the sample cell; and
   a pair of holders for holding ends of the sample cell, either or both of the holders having a double flange structure, the double flange structure including a first flange structure having a first boss that includes a cylindrical recess configured to receive the sample cell and a second flange structure configured to hold a tube connected to the sample cell, the second flange structure being detachably attached to the first flange structure, wherein the cylindrical recess has a diameter greater than a diameter of the sample cell, wherein the cylindrical recess includes a sealing member disposed between an inner surface of the first boss and an outer surface of the sample cell, and wherein the first flange structure has a recess for housing a second boss integrally formed with the second flange structure and for housing the tube held by the second flange structure at an upper portion thereof.

2. The light scattering detection apparatus according to claim 1, wherein the sample cell is disposed in a vertical direction, and an upper holder of the pair of holders is formed in the double flange structure.

3. The light scattering detection apparatus according to according to claim 1, wherein the second flange structure has a tube housing recess for housing the tube and a probe of the tube.

* * * * *